United States Patent [19]
Schochet et al.

[11] 3,833,126
[45] Sept. 3, 1974

[54] SEDIMENTATION APPARATUS
[75] Inventors: Bernard J. Schochet, Salt Lake City; Peter J. Bsumek, Midvale, both of Utah
[73] Assignee: Envirotech Corporation, Salt Lake City, Utah
[22] Filed: July 23, 1973
[21] Appl. No.: 381,368

Related U.S. Application Data
[63] Continuation of Ser. No. 201,316, Nov. 23, 1971, abandoned.

[52] U.S. Cl. .............................................. 210/531
[51] Int. Cl. .......................................... B01d 21/18
[58] Field of Search ............. 210/83, 523, 524, 525, 210/528, 531

[56] References Cited
FOREIGN PATENTS OR APPLICATIONS
1,106,524  3/1968  Great Britain ...................... 210/531

Primary Examiner—Theodore A. Granger
Attorney, Agent, or Firm—Robert R. Finch

[57] ABSTRACT

An elevated boom draws a submerged blade-carrying rake arm in rotation about a vertical column to which the rake arm is connected by a coupling having but a single pivot axis and that axis is directed towards the outer end of the boom; the rake arm, when in motion, is pulled by draft means which fasten at spaced-apart points along the arm which converge therefrom to a common connecting means mounted near the outer end of the boom.

1 Claim, 5 Drawing Figures

SEDIMENTATION APPARATUS

This application is a continuation of Ser. No. 201,316, 11/23/71, now abandoned.

BACKGROUND OF THE INVENTION

Thickeners, as widely used for separating solids from liquids by sedimentation, include a settling tank for holding a generally quiescent pool of liquid, means for introducing feed into the tank, means for separately removing clarified supernatant liquid and settled sludge therefrom. Slow-moving raking means are provided to urge the sludge across the tank bottom to a discharge sump while concomitantly increasing sludge density. The rake arms are usually connected at their inner ends to a rotatably driven torque tube and rotate therewith.

In large tanks, which may exceed one hundred feet in diameter, the raking structure is generally massive to overcome the resistance of the sludge and to support the weight of deposited solids. Such massive raking structures are high in initial cost and are difficult to drive. In a recently proposed arrangement, drive arms are rotatably driven about a vertical column at an elevation above the pool and flexible draft elements extend from the outer ends of the drive arms to spaced-apart attachment points on submerged rake arms which also extend radially from the vertical column. As the drive arms travel, the rake arms are drawn across the tank bottom. Due to the multiple-point suspension of such an arrangement, the rake arm may be lighter than self-supporting arms.

In many operations, surges of solids input result in localized solid deposits which impose such a resistance that damage to the rakes may occur unless special steps are taken. To accommodate these temporary overloads, it is usual to couple the rake arms to the vertical shaft by universal joints so that in response to overload the rake arms pivot upwardly about a horizontal axis of the universal and rearward about a vertical axis. The lifted arms shave the deposit and, upon subsequent passes, wear it away.

OBJECTS OF THE INVENTION

An object of the invention is to provide a thickener rake means which are strong, simple of construction and dependable;

Another object is to provide raking means which will accommodate heavy sludge loads including heavy overloads occasioned by surges;

Still another object is to provide raking means which have but a single pivot axis yet effectively raise to accommodate sludge overloads without damage to the structure.

BRIEF INTRODUCTION TO THE INVENTION

In a thickener, a sediment raking structure is provided which includes an elevated boom drawing a submerged blade-carrying rake arm in rotation about the axis of a central vertical column. The rake arm is connected to the vertical column by a coupling having but a single pivot axis and that axis is directed toward a point on the elevated boom spaced outboard from the central column. The rake arm is pulled by flexible draft means which are connected to extend from spaced-apart points along the rake arm and to converge upwardly therefrom to connect to a common connecting means at the outboard point on the boom.

DETAILED DISCLOSURE

Figure 1:
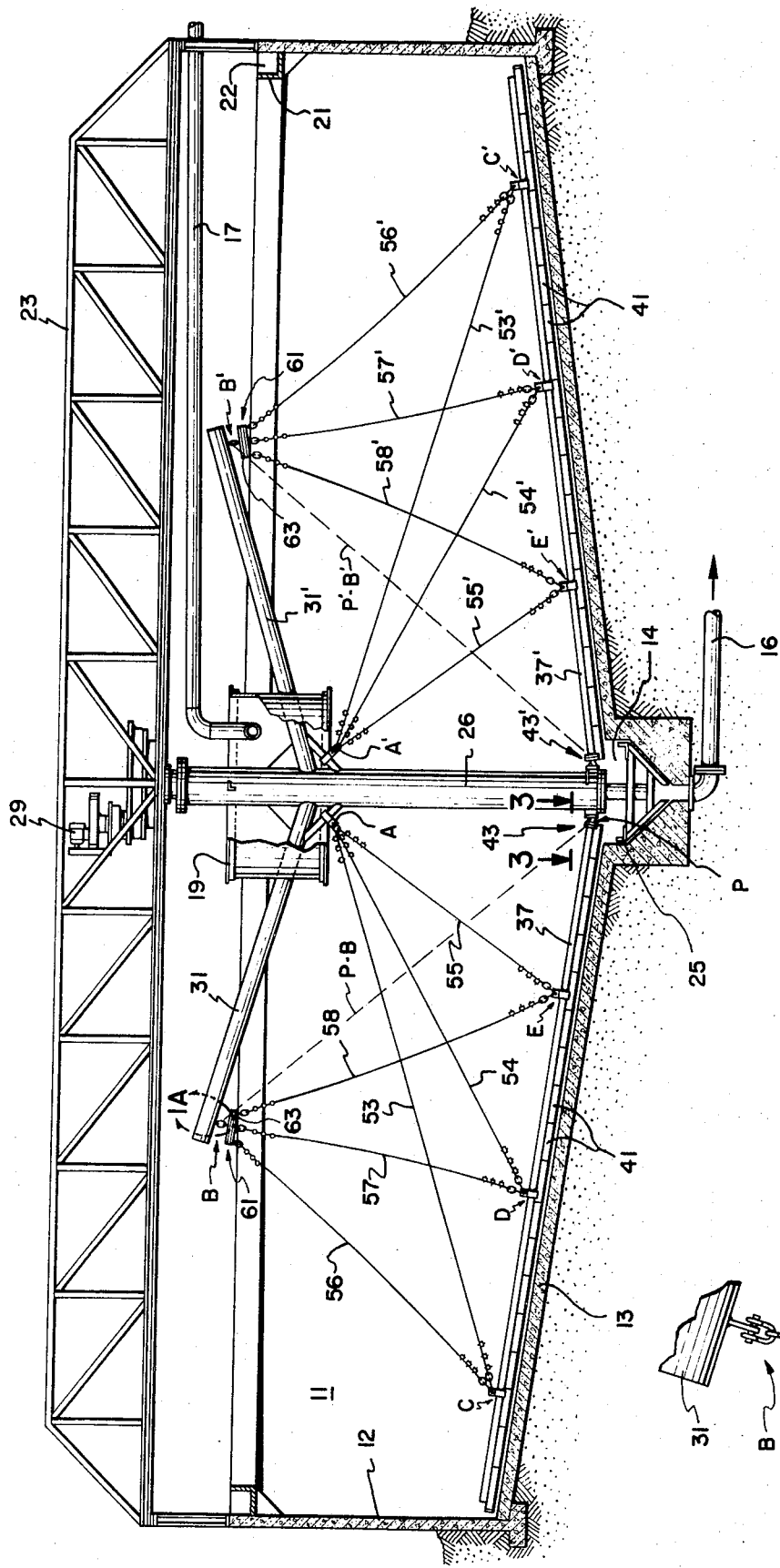
FIG. 1 is an elevation in section of a thickener tank in which the invention is embodied, some parts being cut away for clarity.
Figure 1A:
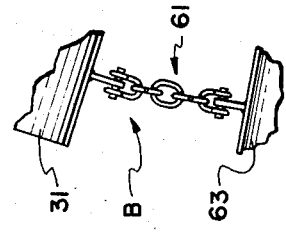
FIG. 1a is an enlarged detail of the structure encircled by arrow 1a in FIG. 1.

The thickener (FIGS. 1 and 2) is of typical construction and includes a settling tank 11 having a marginal sidewall 12 and a circular bottom 13 which slopes downwardly toward a discharge sump 14 which, in turn, communicates with a sludge discharge pipe 16. Incoming feed flows through an elevated feed conduit 17 thence into a cylindrical feedwell 19 from which it is dispersed into the tank 11. An overflow weir 21 is arranged to establish the liquid level; clarified effluent flows over the weir into a peripheral launder 22 for discharge. Other conventional feed and effluent discharge means may be readily utilized. Further typical structure includes an elevated superstructure such as the beam and walkway 23 which traverses the tank 11.

As illustrated, the superstructure supports a depending vertical column or torque-tube 26 which is centrally located in the tank. The lower end of the torque-tube is equipped with scrapers and rotates in the discharge sump cone 14. It is radially restrained therein by a peripheral guide 25. A stationary drive comprising a motor and gear drive 29 mounted on the beam 23 is coupled to the torque-tube 26 to effect rotation thereof about its longitudinal axis in the direction indicated by the curved arrows in FIG. 2.

Two elevated booms 31 and 31' are cantilevered from column 26 to extend in opposite radial directions over the pool. The booms are fixed to the column and rotate therewith. The booms may be of a truss or tubular design to withstand significant loading. According to the invention, two pairs of suspension points (A, B and A', B') are located on the respective booms. The connections A and A' are adjacent the center column and, in fact, may be on the column; points B and B' are spaced further out on the respective booms. A pair of radially directed rake arms 37 and 37' are suspended from the suspension points via means to be hereinafter described thus to be supported and pulled over the tank bottom. The rake arms have their inner ends pivotally connected to the lower end of the support column 28 and, in their normally downward position, radially extend therefrom across the tank bottom. Rake blades 41 are fixed to the arms to sweep sludge across the tank bottom. In practice, the rake arms consist of an elongated rigid but light tubular members to which blades in the form of rectangular plates are fixed at selected angles; many of the lighter rake arms known in the art may be used.

Figure 2:
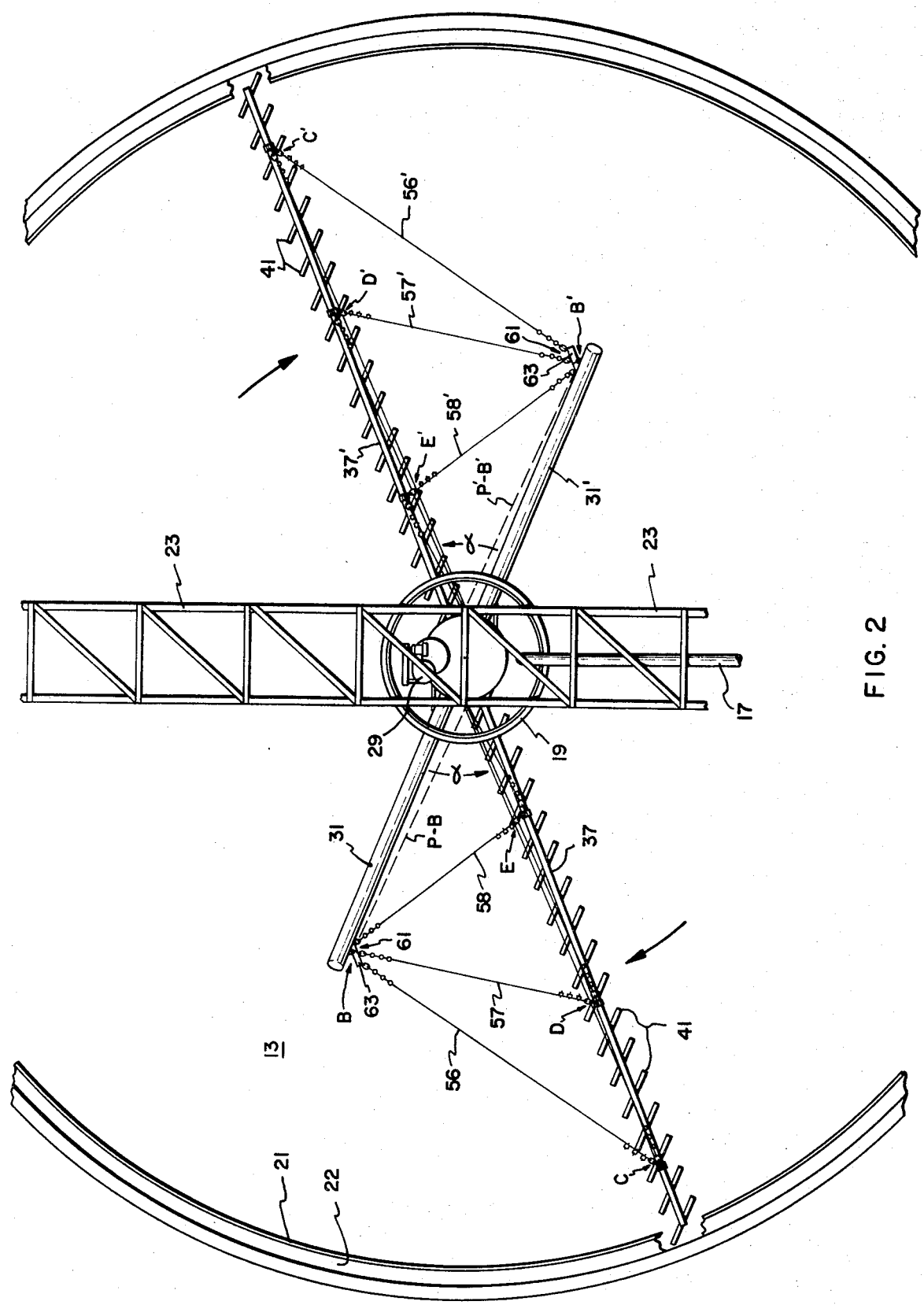
FIG. 2 is a top view of the thickener illustrated in FIG. 1.
Figure 3:
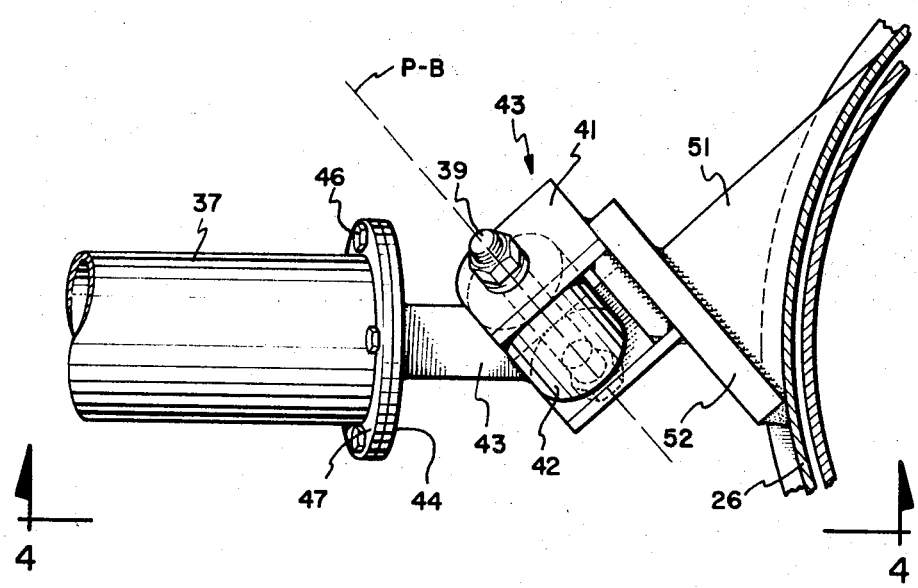
FIG. 3 is a view taken in the plane of the line 3—3 on FIG. 1 and viewed as looking in the direction of the arrows.
Figure 4:
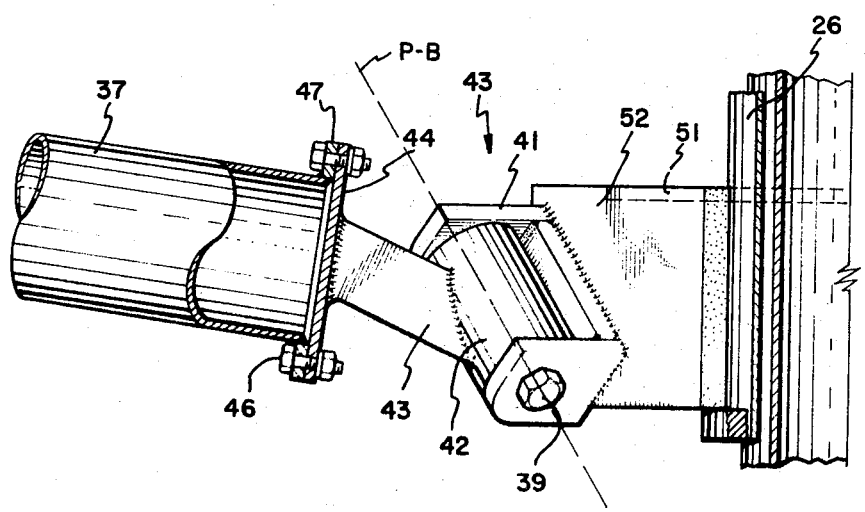
FIG. 4 is a view, partially in section, taken in the plane of the line 4—4 of FIG. 3 and viewed as looking in the direction of the arrows.

As shown in FIG. 2, the rake arms have an angular displacement (lag angle) in the horizontal plane relative to the booms 31 and 31' so that each arm trails its corresponding boom by some acute angle which is illustrated as roughly 45°. The pivotal connection or hinge, generally designated 43, between the inner end of the rake arm 37 and the torque-tube 26 is shown in detail in FIGS. 3 through 5; an identical coupling 43' is provided on arm 37'.

According to the invention, the rake arm 37 pivots about only a single axis relative to the torque-tube; that axis is shown as pin 39 which is fixed through a clevis 41. The pin 39 is always oriented such that its axis is coincident with a line extended through the suspension point B on the boom 31. In other words, coupling 43 is fixed at a point P adjacent the base of the column 26 so that an imaginary extension of its longitudinal axis passes through the outboard point B on the boom from which the rake arm is pulled. This line P–B is the theoretical axis about which the entire arm 37 may be considered to rotate when it pivots about pin 39 and in doing so the arm will describe a cone having its apex at the intersection of line P–B and the arm. As illustrated, the apex would be at point P.

In the illustrated embodiment, a sleeve bushing 42 rotatably fits over the pin 39 and is retained between the legs of the clevis. An extension 43 has one end rigidly fixed, as by welding, to the bushing while the other end is rigidly fixed to a plate 44 which is secured (as by bolts 46 through flanges 47) to the inner end of the rake arm 37. The clevis is rigidly fixed to the support column by gusset plates 51 and 52 which space the clevis radially outwardly of the column a convenient distance. The clevis may, of course, be fixed to the rake arm. With a straight rake arm, the clevis is usually mounted at the same lag angle behind the boom as is the rake arm. That is, the long axis of the rake arm and the clevis lie on a common radius from the center of the vertical column. The extension 43 is provided as a convenient way to secure the rake arm to the hinge at the desired lag angle. When so connected the rake arm is free to pivot about the pin 39 in an arc upwardly and rearwardly thereof.

Each rake arm is supported by flexible guys such as cables 53, 54 and 55 which extend from the inboard connection A to terminate at spaced-apart support points C, D and E, respectively, on the rake arm 37. Additionally, draft means 56, 57 and 58 extend from the pivot means at outboard point B on the boom to connect to the same three support points C, D and E on the rake arm. Each of the draft means may be provided with a turnbuckle (not shown) to adjust their length and tension. The pivot means, generally designated 61, located at suspension point B on boom 31 comprises two or more links, one of which is fixed to the boom 31 and another of which connects to a load beam 63 to which, in turn, the draft means are fixed to extend therefrom. Such an arrangement (a so-called whiffle tree) permits free pivoting and the equalization of tension among the draft means during operation to accommodate flexing of the arm.

The tension on the draft means is set so that, with the rake arm in its normally downward position (parallel to the empty tank bottom), the guys 53–55 support the entire weight of the arm. In this connection, it should be noted that even though the draft cables 56–58 are taut, they do not normally support the arm. When the boom 31 rotates so that the rake arm is set into motion by the resulting pull of the cables, the resistance of liquid and solids in the tank will cause lessening of the tension on the support guys 53–55. This is due to the upward lift of the material in the tank. When the arm encounters a large solids accumulation, or overload, resistance increases, the arm pivots about the pin 39 and the tension on guys 53–55 is further relaxed. With the rotating column as a frame of reference, the arm pivots upward and back thus reducing its bite into the sludge.

The operation of the raking structure and, more particularly, the relation of the draft means 56–58 to the rake arm is, as previously mentioned, a result of the orientation of the axle or hinge bolt 39 utilized on the rake arms. This may be explained as follows: The imaginary extension of the longitudinal axis of the axle through connection point B defines the common side PB of three triangles (PBC, PBD, and PBE) each of which rotate about the side PB at a fixed angle thereto. Assuming a rigid rake arm, the distances PC, PD and PE are always constant and the angles between those sides and line PB are constant. Distance PB is, of course, fixed. Thus, the three triangles PBC, PBD and PBE are of fixed size and shape and do not change as they rotate about side PB. In other words, sides BC, BD and BE (which are the draft means 56–58, respectively) theoretically do not change length as the rake arm pivots. Point A is fixed but is not on the axis of rotation; thus, as the arm 37 pivots, the points C, D and E move closer to point A and the guys 53–55 grow slack. Since the length of the draft means 56–58 remains constant as the arm pivots and the arm rotates at a fixed distance from pivot B, no unnecessary bending or twisting forces are exerted on the arm and stress on the hinge is minimal. Because point B lies on the axis of rotation, tension exerted by the draft means connected thereto cannot effect any rotation of the rake arm about the pivot axis; hence, the arm stays in raking position adjacent the tank bottom until acted upon by other forces tending to resist forward movement of the arm. In practice, the normal position of the arm relative to its pivot axis is determined by the weight of the arm and by external forces tending to raise it. When the arm encounters an unusual accumulation of settled solids, resistance to raking increases with a resultant increase in the tension on the draft means. Under these circumstances, there is an upward component introduced which forces the arm to move upwardly so that the rakes take an increasingly shallower bite until the weight of the arm equals the upward force component. In other words, the arm raises in response to lifting forces which exceed the effective weight of the arm.

In practice, the relative orientations of the various components are never quite exact and, furthermore, various components flex during operation. For example, the rake arm bends slightly due to its own weight and may flex somewhat when it encounters an obstacle. Nevertheless, due to the hinge axis orientation, the rake arm is not subjected to bending forces imposed by the draft means and no warping stresses are imposed on either the hinge or the arm. The hinge functions properly so long as it is substantially directed towards the pivot point at the boom end; deviation by a few degrees has little adverse effect.

Although the invention has been described in connection with a so-called beam-type thickener in which the drive and rake assembly are supported by a superstructure spanning the tank, it is equally useful in center pier machines in which a stationary central pier supports both the drive mechanism and a rake-arm supporting torque-tube or cage. Also, the invention may be utilized in structures in which the boom is rotated about the center by forces acting on the outer end of the boom adjacent or on the upper edge of the tank wall such as employed in the so-called traction-drive machines.

We claim:

1. A raking structure for moving settled solids toward a discharge opening in the bottom of a sedimentation tank comprising:
   a. a first rotatable structure located medially of and above the tank bottom and arranged to be driven about a vertical axis;
   b. a radially extending boom fixed to and rotatable with said first rotatable structure at an elevation above the tank bottom;
   c. a rake arm support located in said tank below said first rotatable structure and rotatable coaxially therewith;
   d. a rake arm extending generally radially from said support and having a plurality of transverse rake blades;
   e. coupling means connecting the inner end of said rake arm to said rake arm support said means including a first element comprising a single rigid pin and a second element comprising a cylindrical bushing adapted to encircle said pin for rotation thereabout, one of said elements being fixed to said rake arm support and the other of said elements being fixed to said inner end of said rake arm, the element on said rake arm support is angularly displaced a preselected distance from the inner end of said radially extending boom and said first and second elements are so positioned that said single pin is tilted so that an extension of its axis will intersect a connection point on said boom located outwardly of said vertical axis, and said elements of said coupling means being arranged so that said rake arm will normally be in a position in which said transverse blades are substantially parallel to the tank bottom;
   f. draft means extending between said connection point on said boom and a tow point on said rake arm said draft means being of length to make such connection in a straight line when said rake arm support is angularly displaced from said boom the said preselected distance described in paragraph (e);

whereby when said first rotatable structure and said boom are rotatably driven and said rake arm is unresisted said rake arm and transverse blades are pulled over said tank bottom substantially parallel thereto and when movement of said rake arm is resisted during such rotation said arm rotates to describe a partial cone about the axis of said single pin thereby elevating said arm relative to said bottom while simultaneously tilting the said transverse blades.

* * * * *